(12) United States Patent
Mascola (10) Patent No.: US 10,773,562 B2
(45) Date of Patent: Sep. 15, 2020

(54) RAIL GEAR APPARATUS

(71) Applicant: CUSTOM TRUCK & EQUIPMENT LLC, Kansas City, MO (US)

(72) Inventor: James V. Mascola, Olathe, KS (US)

(73) Assignee: Custom Truck & Equipment LLC, Kansas City, MO (US)

( * ) Notice: Subject to any disclaimer, the term of this patent is extended or adjusted under 35 U.S.C. 154(b) by 473 days.

(21) Appl. No.: 15/906,445

(22) Filed: Feb. 27, 2018

(65) Prior Publication Data

US 2019/0263205 A1 Aug. 29, 2019

(51) Int. Cl.
*B60F 1/04* (2006.01)

(52) U.S. Cl.
CPC ............... *B60F 1/04* (2013.01); *B60F 1/043* (2013.01)

(58) Field of Classification Search
CPC .................................. B60F 1/04; B60F 1/043
See application file for complete search history.

(56) References Cited

U.S. PATENT DOCUMENTS

| | | | | |
|---|---|---|---|---|
| 3,263,628 A | * | 8/1966 | Grove | B61D 15/02 105/72.2 |
| 3,980,025 A | * | 9/1976 | Olson, Sr. | B60F 1/043 105/72.2 |
| 4,534,297 A | * | 8/1985 | Johnson, Sr. | B60F 1/043 105/215.2 |
| 4,941,408 A | * | 7/1990 | Lovitt, Jr. | B60F 1/043 105/178 |
| 9,643,463 B2 | | 5/2017 | Davis | |
| 2012/0024189 A1 | * | 2/2012 | Wickman | E02F 9/022 105/72.2 |
| 2014/0261067 A1 | * | 9/2014 | Davis | B60F 1/00 105/215.2 |

* cited by examiner

*Primary Examiner* — Scott A Browne
(74) *Attorney, Agent, or Firm* — Lathrop GPM, LLP (57) ABSTRACT

A rail gear system for attachment to the frame rails of a truck that readily accommodates the span of the frame rails. The system including an axle tube, a pivot tube, first and second spring sub-systems, and a pivot bar with an actuator plate mounted to the pivot bar. Frame rail mounting brackets are secured to the two frame rails of the truck. A primary actuator is employed to elevate the axle tube off of the rails and adjustment of the width of the frame rails is accomplished by movement of the bushings along both the pivot tube and pivot bar until the desired separation between the frame rail mounting brackets is achieved.

36 Claims, 9 Drawing Sheets

RAIL GEAR APPARATUS

TECHNICAL FIELD

The present disclosure relates to rail gear apparatus that can be mounted to the frame rails of a truck for use on railways.

BACKGROUND

Rail gear is used to adapt highway trucks and similar vehicles of all duty levels for railway applications requiring travel on the highway and on the rail. Rail gear is widely used because railroad workers regularly use trucks to inspect track and make repairs among other activities. Many times the challenge with rail gear is not in the operation or maintenance of the units but with the installation of the units onto the vehicles. Truck frames are regularly redesigned to, for example, accommodate larger radiators, catalytic converters and exhaust systems. The wide ranging span between the rail frames of heavy duty dual use trucks poses a challenge for the expeditious attachment of rail gear and particularly attachment without the use of shims between the frame rails and the attachment brackets of the rail gear.

SUMMARY

Rail gear for attachment to truck frame rails is widely utilized in the rail industry. One of the greatest challenges with rail gear is the ability to cost efficiently secure the gear to the frame rails of the truck. Because different truck vendors, e.g., GM, Ford and Chrysler, produce trucks with frame rails separated by varying distances, the process for attachment of the rail gear requires regular modification to accommodate the varying widths. Often times the individual installing the rail gear must utilize one or more shims between the frame rail and the frame rail mounting bracket in order to rigidly secure the rail gear to the vehicle. This is a cumbersome and time consuming process when dealing with heavy and cumbersome rail gear. The frame rail mounting brackets of the disclosed apparatus can be manually and quickly adjusted to the distance separating the frame rails of the truck without the use of shims.

The rail gear apparatus disclosed herein utilizes split bushings and taper lock bushings mounted respectively onto a pivot bar and a pivot tube to facilitate the repositioning of the frame rail mounting bracket to align with the frame rails of the truck. The installer need only loosen the set screws of the taper lock bushings and move each of the frame rail attachment brackets to the desired location adjacent each of the truck frame rails. Once the brackets are adjacent the frame rails the installer tightens the split bushing set screws locking the split bushing in position and secures the brackets to the frame rails. The only remaining installation procedure is for the installer is to connect hydraulic lines to the main hydraulic actuator and the locking actuator and to run wiring to the position sensor on the rail gear and the grounding system for the vehicle.

It is an object of the rail gear disclosed herein to eliminate the need for shims to close the gap between the frame rail mounting bracket and the frame rails of the truck.

It is an object of the rail gear disclosed herein to utilize a near centrally positioned hydraulic actuator for elevating the rail guide wheels in order to avoid binding of the rail gear members as the rail gear traverses between an on-rail and off-rail position.

Various objects, features, aspects and advantages of the inventive subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims. The contents of this summary section are provided only as a simplified introduction to the disclosure, and are not intended to be used to limit the scope of the appended claims.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims FIG. 1 reveals a truck with a rail gear unit 10 mounted thereon. A rail gear unit 10 is secured to both the front and the rear of the truck 12 to facilitate transit of the truck along a railway 14. In operation, the guide wheels 16 of the rail gear unit 10 are positioned atop the rails 14 and transfer a portion of the load from the suspension of the truck 12 such that approximately 500 pounds of force are applied to each guide wheel 16. The remainder of the weight of the truck 12 continues to pass through the tires 18, 20 of the truck with the tires maintaining pressure upon the rails 14. Five hundred pounds of force is the amount of weight applied to the guide wheels considered appropriate to maintain the guide wheels 16 on the rails 14 but not to overload the rail gear. Considerable weight must remain on the truck's rear drive wheels 20 to allow the truck's drive wheels to gain traction and propel the truck 12 along the rails 14.

Axle Tube

Figure 2:
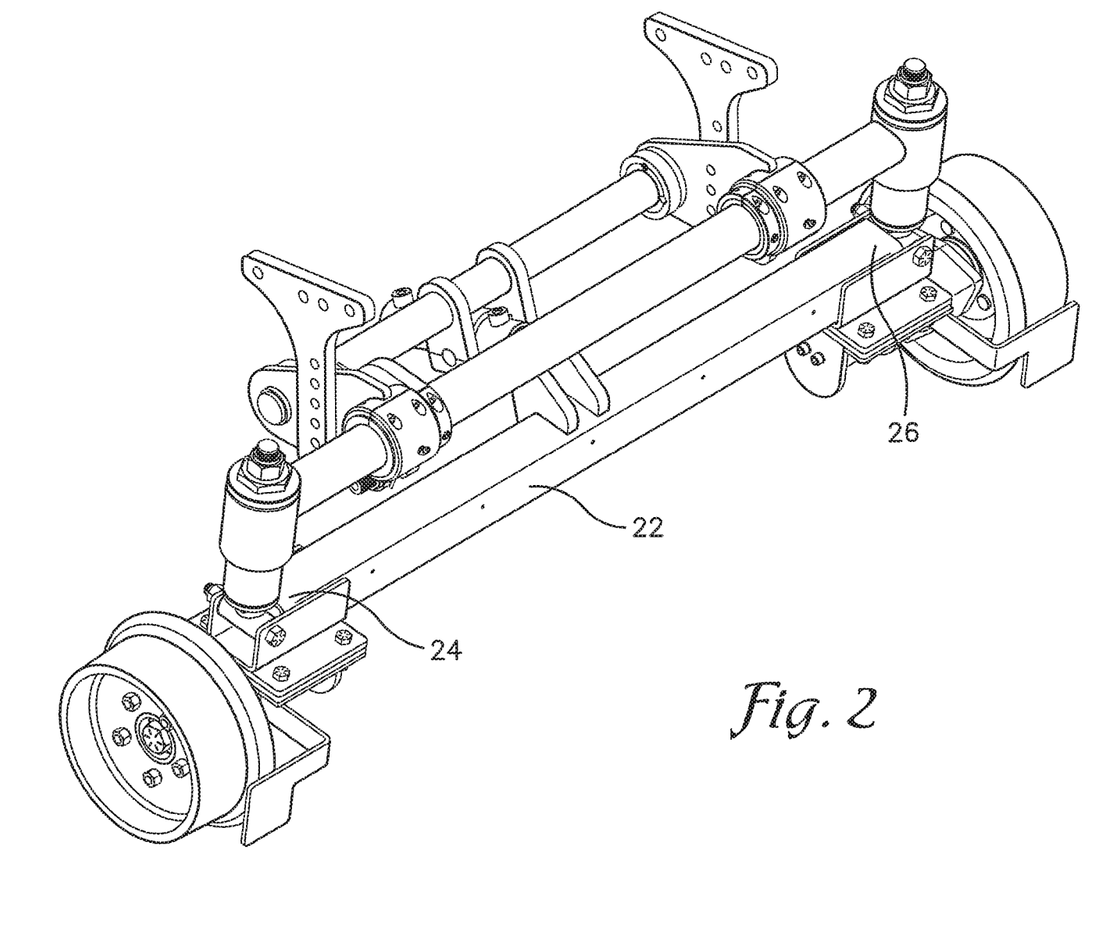
FIG. 2 is a perspective view of an embodiment of the rail gear.

FIG. 2 reveals that the disclosed rail gear unit 10 utilizes an axle tube 22 with first and second oppositely disposed ends 24, 26. The axle tube 22 is preferably fabricated from steel in order to withstand the considerable forces applied to the member and avoid any bending or torsion that results in plastic deformation of the axle tube. The wall thickness and dimensions of the axle tube 22 are determined based upon the loads applied to the axle tube which are dependent upon the weight of the truck 16 to which the rail gear unit 10 is attached and any anticipated maximum load to be carried by the truck.

Spring Assemblies

Figure 3:
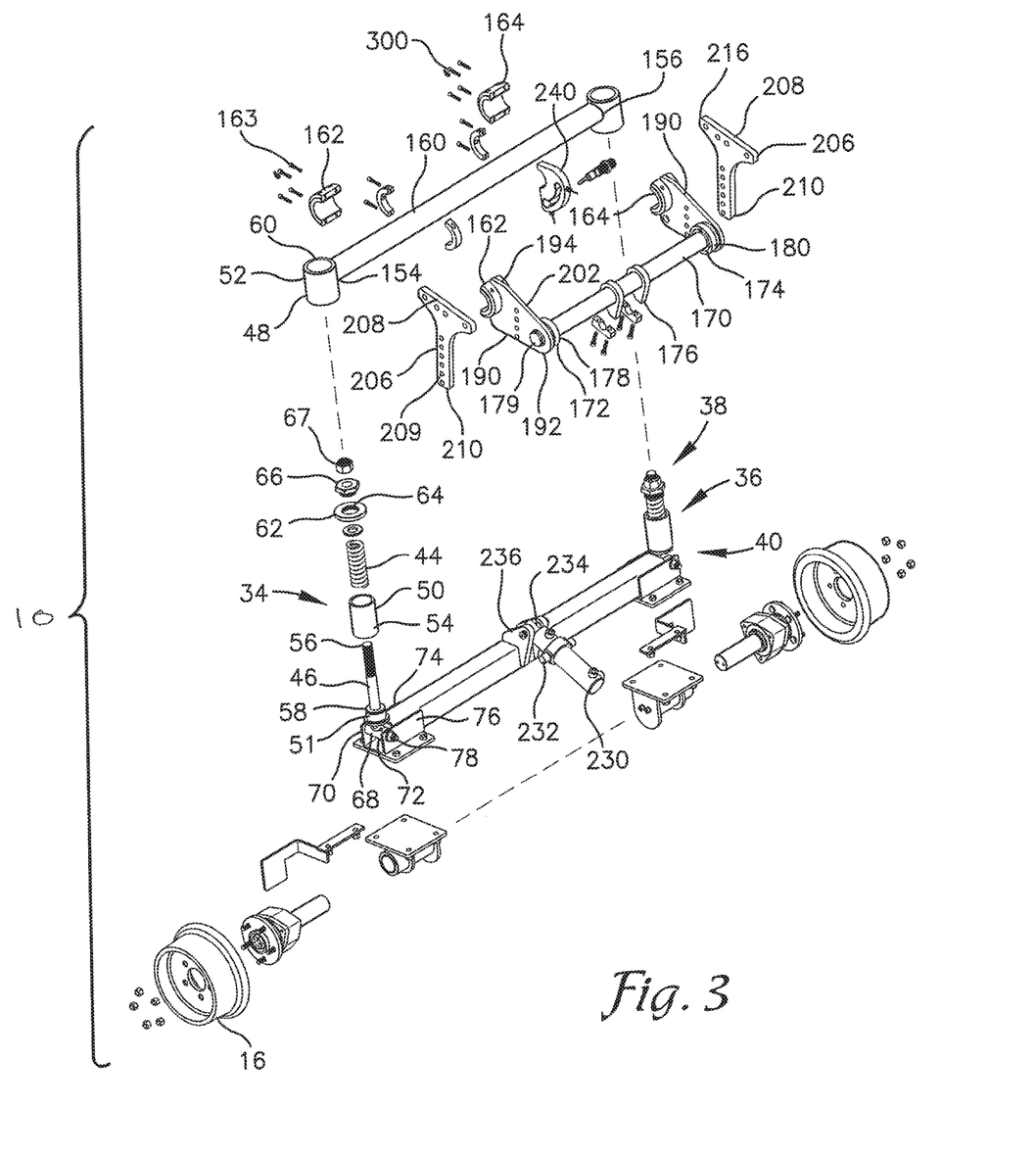
FIG. 3 is an exploded view of an embodiment of the rail gear.
Figure 4:
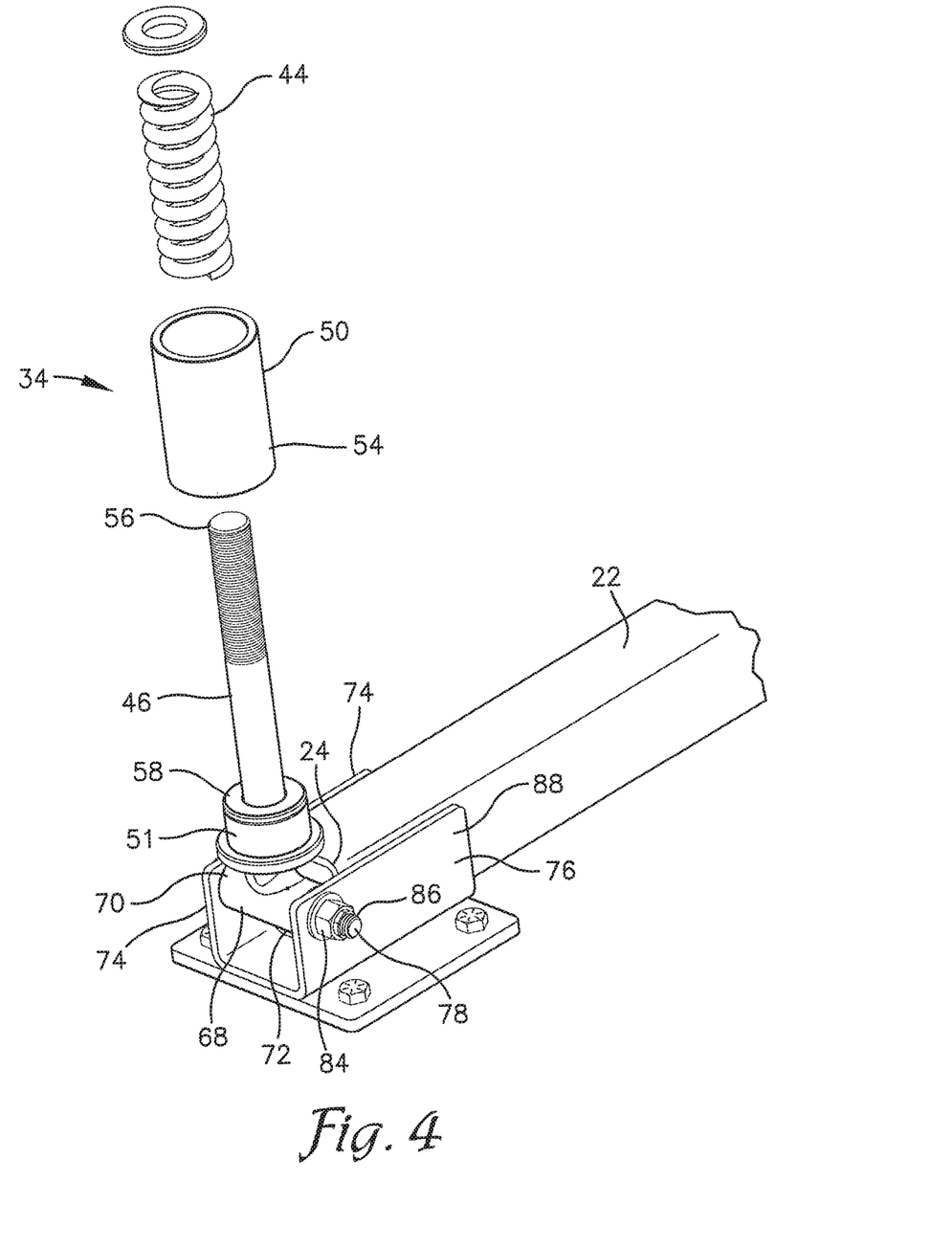
FIG. 4 is an embodiment of a portion of the spring assembly of the rail gear of FIG. 2.

FIGS. 3 and 4 reveal that each spring assembly 34, 36 includes an upper end and a lower end 38, 40. Each of the spring assemblies 34, 36 utilizes a spring 44 mounted over, or surrounding, a spring shaft 46 with an upper spring tube 48 and a lower spring tube 50 surrounding the spring 44 and spring shaft 46. The upper and lower spring tubes 48, 50 each have a tube wall 52, 54. The upper spring tube wall 52 is of a greater inner diameter than the outer diameter of the lower spring tube wall 54 thereby allowing the upper spring tube 48 to slide down over the lower spring tube 50 when the load applied to the spring causes it to compress.

The spring shaft 46 comprises an upper end 56 and a lower end 58. The upper end 60 of the upper spring tube 48 is capped, preferably by welding, with a rigid circular plate 62. The plate 62 includes a central opening 64 for passage there through of the upper end 56 of the spring shaft 46. The upper end 56 of the spring shaft 46 is preferably threaded for receipt of a fastener 66 and locking fastener 67 to maintain the upper spring tube 48 in position over the spring 44. The rigid plate 62 serves as a bearing plate for the fastener 66 and maintains the spring in position internal to the spring tubes 48, 50. The springs 44 utilized in the spring assemblies 34, 36 are preferably compression coil springs, for which the size and desired spring parameters can readily be determined by those skilled in the design of rail gear systems. An elastomeric bushing 51, as shown in FIG. 4, resides at the base of the spring 44 to attenuate shock and vibration prior to transfer to the spring 44.

Figure 5:
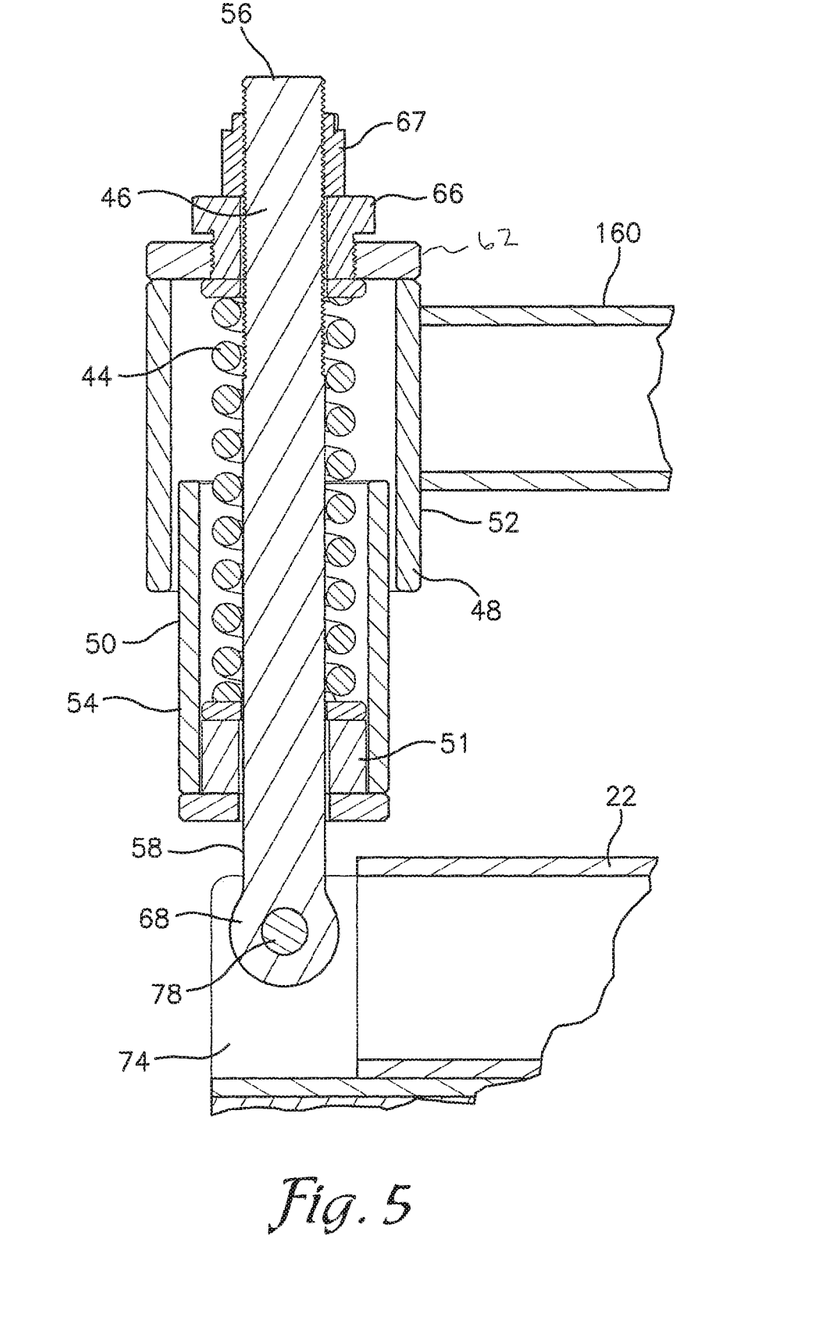
FIG. 5 is a cutaway view of an embodiment of a portion of the spring assembly of the rail gear of FIG. 2.
Figure 6:
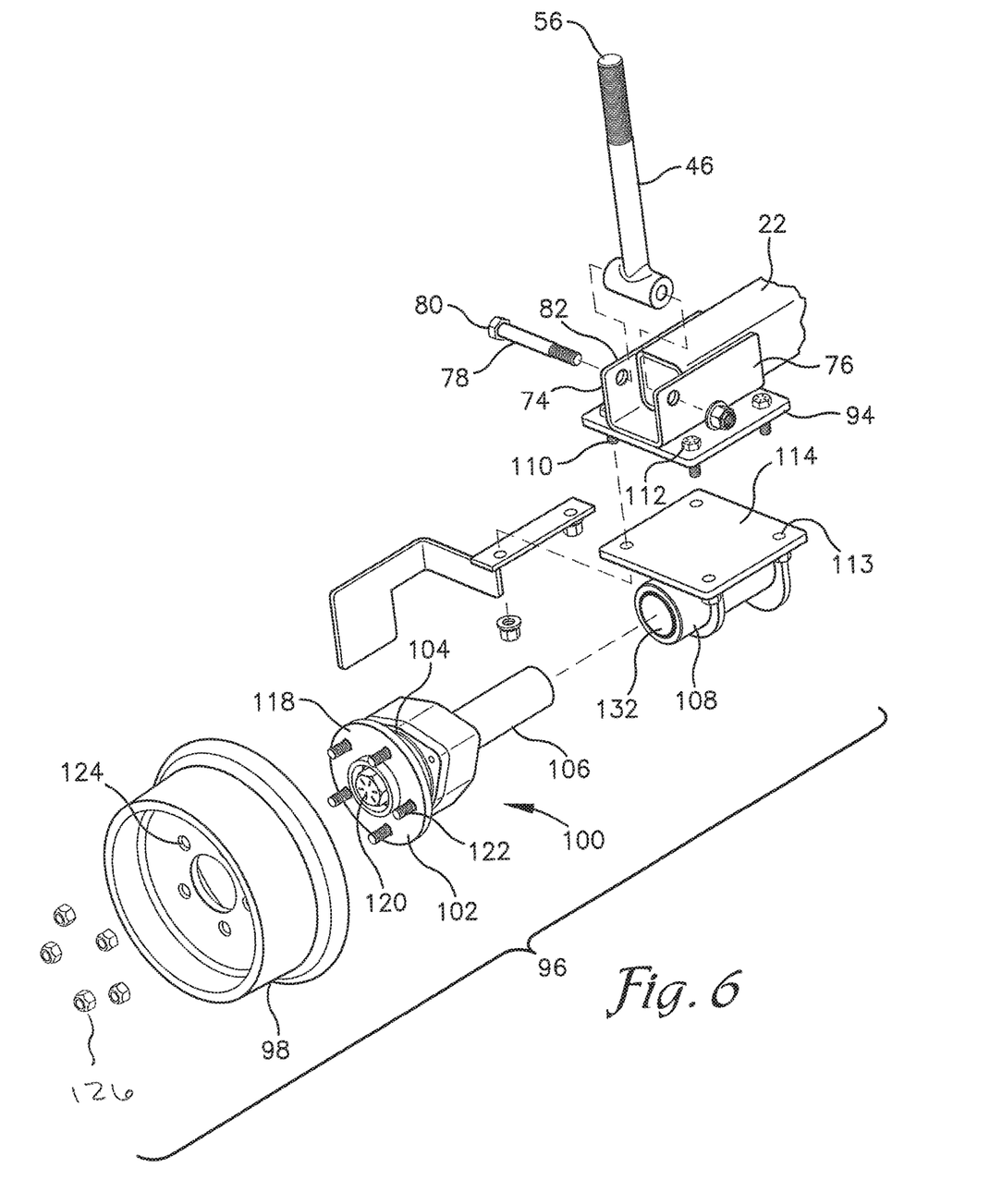
FIG. 6 is an exploded view of an embodiment of a hub assembly of the rail gear.

FIGS. 4 and 5 reveal that the lower end 58 of the spring shaft 46 is secured, preferably by welding, to a support tube 68. Opposing ends 70, 72 of the support tube 68 are captured between oppositely disposed support tube mounting plates 74, 76. Passing through the support tube 68 is the shaft, as best seen in FIG. 6, of a bolt 78 with the head 80 of the bolt positioned against the outer face 82 of the first mounting plate 74 and a nut 84 mounted to the threads 86 of the bolt with the nut positioned against the outer face 88 of the second mounting plate 76. The support tube 68 is secured in position by the bolt 78 passing through the mounting plates 74, 76 and the bolt is secured in position by the head 80 and nut 84 secured against the outer faces 82, 88 of the mounting plates 74, 76. Utilization of lock washers may be appropriate to prevent unintended loosening of the nut due to the extreme vibration the rail gear 10 experiences while traversing the rails. The support tube mounting plates 74, 76 are preferably welded to the axle tube 22 and extend slightly beyond each of the ends 24, 26 of the axle tube 22 in order to allow space for the support tube 68 to span laterally across the width of the axle tube 22.

Wheel Unit Assembly

FIG. 6 reveals that secured beneath each pair of support tube mounting plates 74, 76 is a shaft mounting plate 94. The shaft mounting plate 94 is preferably welded to the support tube mounting plates 74, 76 that are welded to the axle tube 22. Mounted beneath each shaft mounting plate 94 is a wheel unit assembly 96. The wheel unit assembly 96 is comprised of a guide wheel 98 mounted to a hub assembly 100. The hub assembly 100 is further comprised of a hub flange 102 with a front face 104 and extending outwardly from the hub assembly 100 is a spindle 106. A set of sealed bearings (not shown) allow the hub flange 102 to rotate while the spindle 106 remains stationary. As seen in FIG. 6, the spindle 106 is housed within a spindle tube 108 that is in turn secured to the shaft mounting plate 94 preferably by a series of threaded fasteners 110 passing through openings 112 in the shaft mounting plate 94 and openings 113 in the spindle tube mounting plate 114.

As seen in FIG. 6, a face plate 118 is mounted to the front face 104 of the hub assembly 100. The face plate 118 is typically secured to the hub assembly 100 with three threaded fasteners 120. Extending outwardly from the face plate 118 are typically four to six lugs 122 that pass through openings 124 in the guide wheel 98 and to which lug nuts 126 are used to secure the guide wheel 98 to the hub assembly 100. The hub assembly 100 and face plate 118 are preferably standard components produced for use by major automobile manufacturers such as Ford, General Motors and Chrysler.

Figure 7:
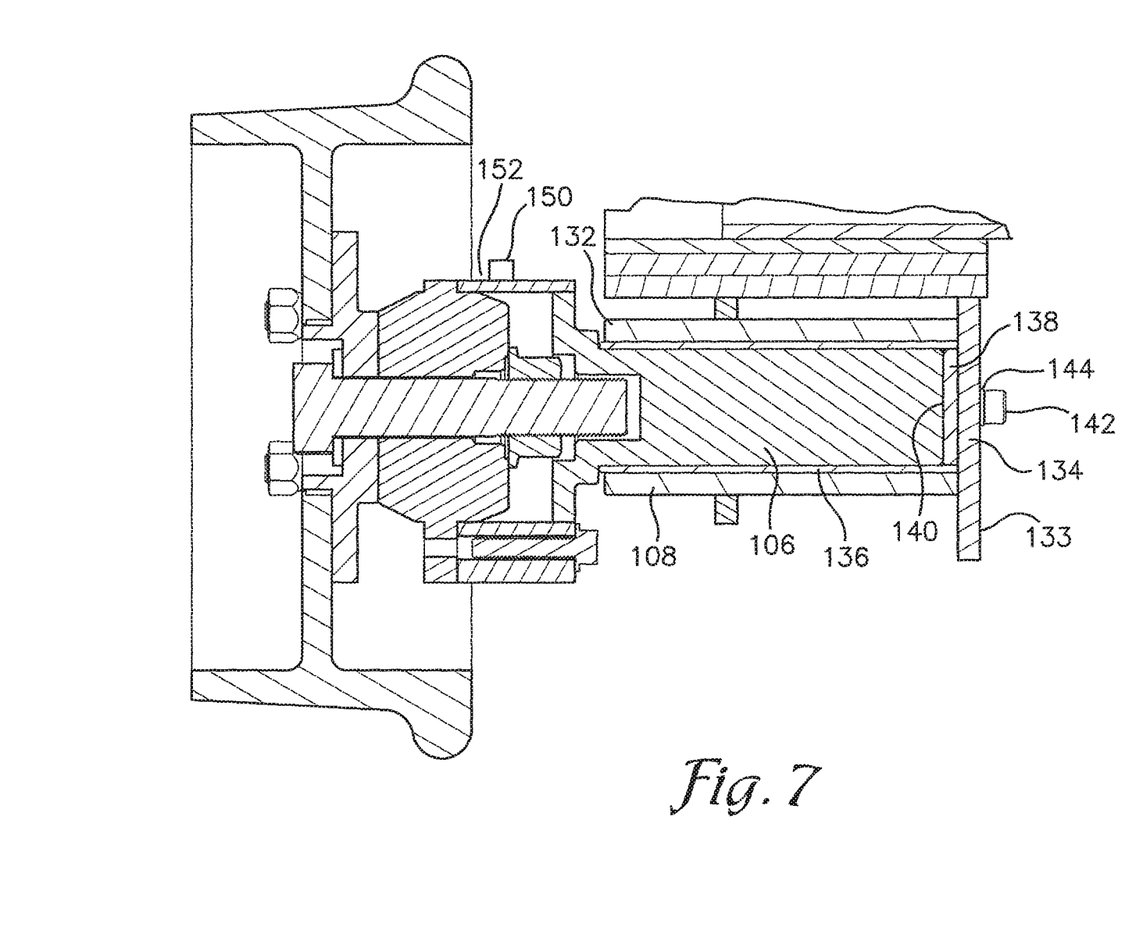
FIG. 7 is a sectional view of an embodiment of the hub assembly of the rail gear.

As previously noted, extending outwardly from a rear face 130 of the hub assembly 100 is the spindle 106. The wheel unit assembly 96 also includes a spindle tube 108 with an open end 132 and a closed end 134. An electrically non-conductive spindle sleeve 136, as seen in FIG. 7, fabricated from for example, graphite, is placed over the spindle 106 and the spindle and sleeve 136 are inserted into and co-located within the spindle tube 108. Additional insulating material, such as graphite, in the form of a spacer or shim 138, is positioned between the closed end 134 of the spindle tube 108 and the distal end 140 of the spindle 106 to electrically isolate the spindle from the spindle tube 108.

In order to retain the spindle 106 within the spindle tube 108, a pair of threaded fasteners 142 pass through the closed end 134 of the spindle tube 108, through the electrically non-conductive spacer 138 and are threaded into the distal end 140 of the spindle 106. In order to maintain electrical isolation, a non-conductive washer 144 is positioned between the head of the fastener 142 and the exterior surface 133 of the closed end 134 of the spindle tube 108. The sides of the fasteners 142 may also be coated, or lined, with a non-conductive insulating material to avoid undesired current flow.

Electrical isolation between the two rail members 14 allows the truck 12 to operate on the rails without triggering sensors that activate railroad crossing gates. In order to avoid activating the crossing gates electrical isolation between the two rails 14 is required. Selectively controlling electrical continuity between the two rails is critical to safe and efficient operation of the on-rail maintenance vehicles and personnel as well as road based vehicles and occupants that may be impacted by railroad crossing gates. Many times when in an operational mode the crews in trucks utilizing the rail gear 10 do not want to activate crossing gates as they approach a crossing. This may because crews are working for an extended period of time on rails, or ancillary equipment, in close proximity to the crossing gates and do not want crossing arms to be lowered thereby unnecessarily blocking the flow of vehicle traffic.

To selectively control electrical connectivity, a ground wire 150 traverses from a connection point 152 on the hub assembly 100 through an interior channel (not shown) of the axle tube 22 exiting the interior channel and into the cab of the truck 12. Separate ground wires 150 traverse from each hub assembly 100 into the cab of the truck 12 and are connected at a toggle type switch (not shown). The operator may toggle between connectivity and non-connectively of the two rails as the situation dictates.

Pivot Tube

Figure 8A:
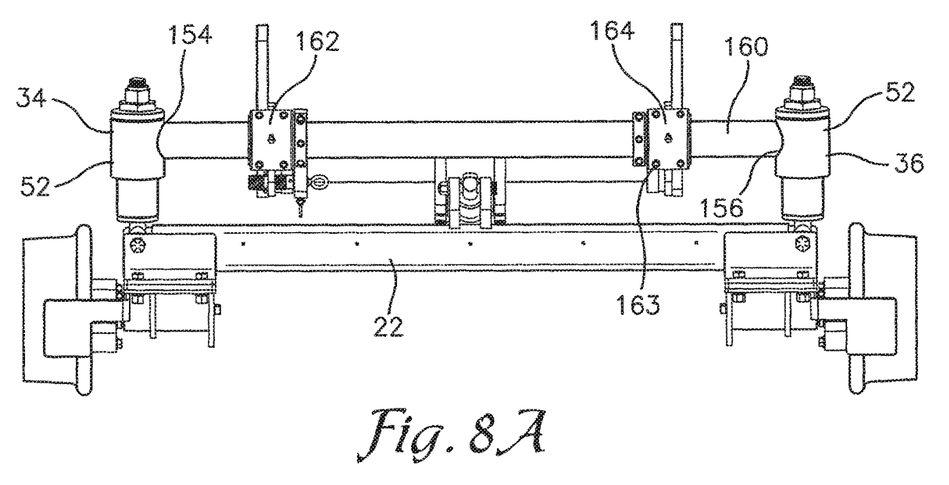
FIG. 8A is an elevation view of an embodiment of the rail gear.
Figure 8B:
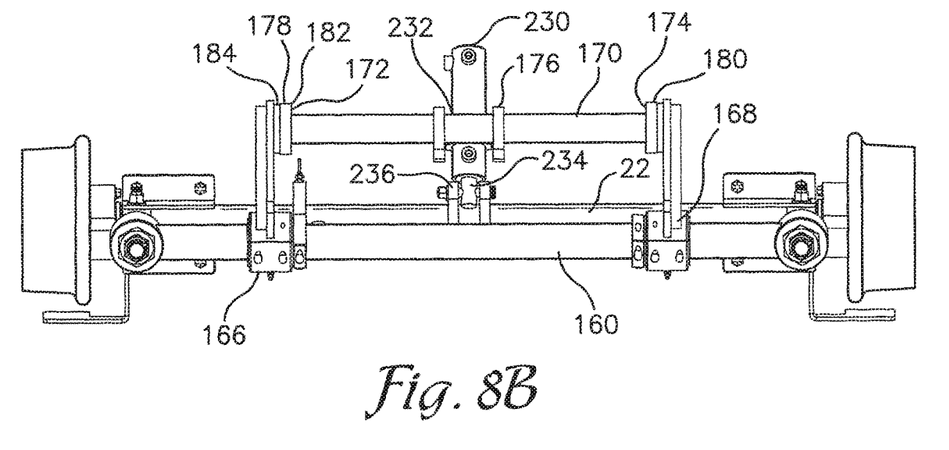
FIG. 8B is a plan view of an embodiment of the rail gear.

In addition to the axle tube 22, spring assemblies 34, 36 and wheel unit assemblies 96, the rail gear 10, as shown in FIGS. 3, 8A and 8B, utilizes a pivot tube 160 with first and second oppositely disposed ends 154, 156. The pivot tube 160 spans between the two spring assemblies 34, 36 and is attached, preferably by welding, to the tube walls 52 of the upper spring tubes 48 on each side of the rail gear unit 10. The pivot tube 160 is preferably fabricated from tubular steel because of the need to resist large forces generated by the weight of the truck that can result in deformation of the rail gear components. The specific diameter and wall thickness of the pivot tube 160 are most appropriately determined based upon vehicle maximum gross weight. The sizing of the pivot tube 160 dimensions is well within the purview of those familiar with rail gear design.

The pivot tube 160 also utilizes a pair of pivot tube bushings 162, 164. These bushings are preferably two-piece clamping shaft collar designs that are capable of providing significant axial holding power when fully tightened; however, the bushing set screws 163 can also be quickly loosened and the bushings themselves can readily be slid along the pivot tube 160 in order to accommodate the distance between the frame rails of the truck during the rail gear to truck installation process. The procedure for changing the location of the bushings 162, 164 to accommodate the span of the frame rails of the truck is discussed in greater detail below.

Pivot Bar

The rail gear 10 also utilizes a pivot bar 170 with first and second oppositely disposed ends 172, 174 as well as at least one, and preferably two, pivot bar actuator plates 176 mounted to the pivot bar 170 between the first and second ends. The pivot bar 170 also utilizes first and second pivot bar bushings 178, 180 mounted adjacent to the first and second ends and each of these bushings has an inner and an outer face 182, 184. The bushings 178, 180 are preferably taper-Lock™ bushings that are split through the flange and gradually taper to provide a clamp fit on the shaft that is the equivalent of a shrink fit.

Connector Plates

As shown in FIG. 3, the pivot bar 170 and the pivot tube 160 disclosed herein are connected to one another with a pair of connector plates 190 at the oppositely disposed ends 172, 174 of the pivot bar 170 and at locations somewhat internal to the full longitudinal span of the pivot tube 170. The connector plates 190 each have a first end and a second end 192, 194. As previously noted, a bushing 178, 180 is mounted proximate each end 172, 174 of the pivot bar 170 and each bushing is preferably welded to the inner face of the first end 192 of each connector plate 190. A locking ring 179, or a similarly functional member, is preferably disposed adjacent the first end 192 of the outer face of each connector plate 190 preventing the first and second ends 192, 194 of the pivot tube 170 from withdrawing back through the connector plate 190. The second ends 194 of the connector plates 190 are mounted, preferably by welding, to the outer shell of the first and second pivot tube bushings 162, 164.

As seen in FIG. 3, extending upwardly and secured to a center portion 202 of the connector plates 190 are first and second frame rail mounting brackets 206. The two frame rail mounting brackets 206 have an upper portion 208 and a lower portion 210 with the upper portions mounted to the two frame rails of the truck 12. The lower portions 210 of the frame rail mounting brackets 206 are preferably secured to the connector plates 190 by at least two, and preferably more, threaded fasteners (not shown) passing through holes 209 in both the connector plates 190 and the lower portion 210 of the frame rail mounting brackets 206 and are rigidly secured in position by nuts threaded onto the fasteners 212. The upper portion 208 of the frame rail mounting brackets 206 preferably include a plurality of through holes 216. Fasteners 220 are passed through the holes of the upper portion of the frame rail mounting brackets 206 and into the frame rails of the truck 12 securing the rail gear 10 to the truck.

Primary Actuator

As seen in FIGS. 3 and 8B, the rail gear design disclosed herein utilizes a primary actuator 230 to reposition the rail gear 10 from on-road to on-rail positions and vice versa. The primary actuator 230 is preferably a hydraulic actuator, however, an electric, or a pneumatic actuator, are also contemplated by the disclosure herein. The base mount 232 of the primary actuator is mounted to one or more pivot bar actuator plates 176 located on the pivot bar 170. The actuator's rod mount 234 is preferably mounted to a pivot plate 236 on the axle tube 22. The primary actuator 230 is preferably powered with a small electrically driven hydraulic pump (not shown) capable of delivering hydraulic fluid under sufficient pressure and volume. The hydraulic pump is ideally positioned within the bed of the truck 14 where it is protected from damage and the elements.

Rail Gear Positional Lock Assembly

Figure 9:
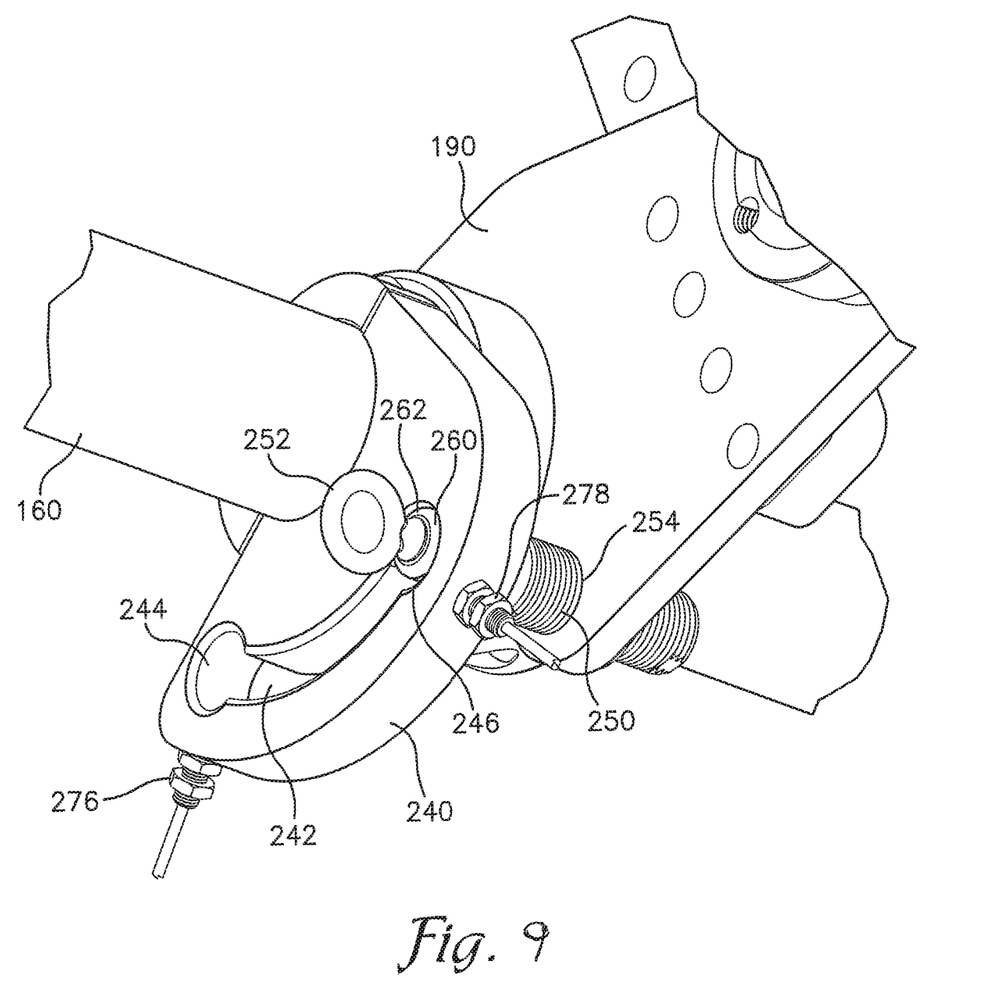
FIG. 9 is a perspective view of an embodiment of the locking gear assembly of the rail gear.

As shown in FIGS. 3 and 9, the rail gear 10 disclosed herein is capable of rotating between an on-rail and an off-rail position. It is important from a safety perspective that the rail gear, particularly when in the on-rail position, maintain the on-rail configuration so as to prevent the guide wheels 16 from leaving the rails 14 and potentially creating a truck out-of-control scenario. In order to lock the rail gear 10 into an on-rail or off-rail position, disclosed herein is a locking assembly.

The rail gear utilizes a locking plate 240 which is secured to and rotates with the pivot tube 160 between the rail gear on-rail to off-rail positions. The locking plate 240 includes an arcuate slot 242 with circular openings 244, 246 at each end of the arcuate slot 242. A locking actuator 250, which is preferably a hydraulic actuator with an extensible end 252, is transversely mounted within an opening 254 in the connector plate 190 proximate the arcuate slot 242 in the locking plate 240. The locking actuator 250 includes a locking actuator rod with a distal end 260, and a locking rod member 262 mounted at the distal end 260 of the locking actuator rod.

The arcuate slot 242 within the locking plate 240 is capable of rotating past the stationary locking actuator rod and the locking rod member 262 as the rail gear 10 changes orientation. More precisely, when the locking rod member 262 is fully extended and is no longer seated in either of the circular openings 244, 246 the rail gear 10 is unlocked and the primary actuator 230 is able to rotate the axle tube 22 and the locking plate 240 relative to the stationary connector plate 190. It is only when the rail gear 10 reaches either the fully deployed on-rail position or the fully retracted off-rail position that the locking rod member 262 is also retracted and is able to seat within the circular openings 244, 246 located at each end of the arcuate slot 242. Proximity switches 276, 278 are positioned within the locking plate 240 at the circular openings and sense the position of the locking rod member 262. The signals from the proximity switches 276, 278 are relayed to instrumentation in the cab of the truck alerting the operator as to the orientation of the rail gear 10.

Rail Operation

Figure 1:
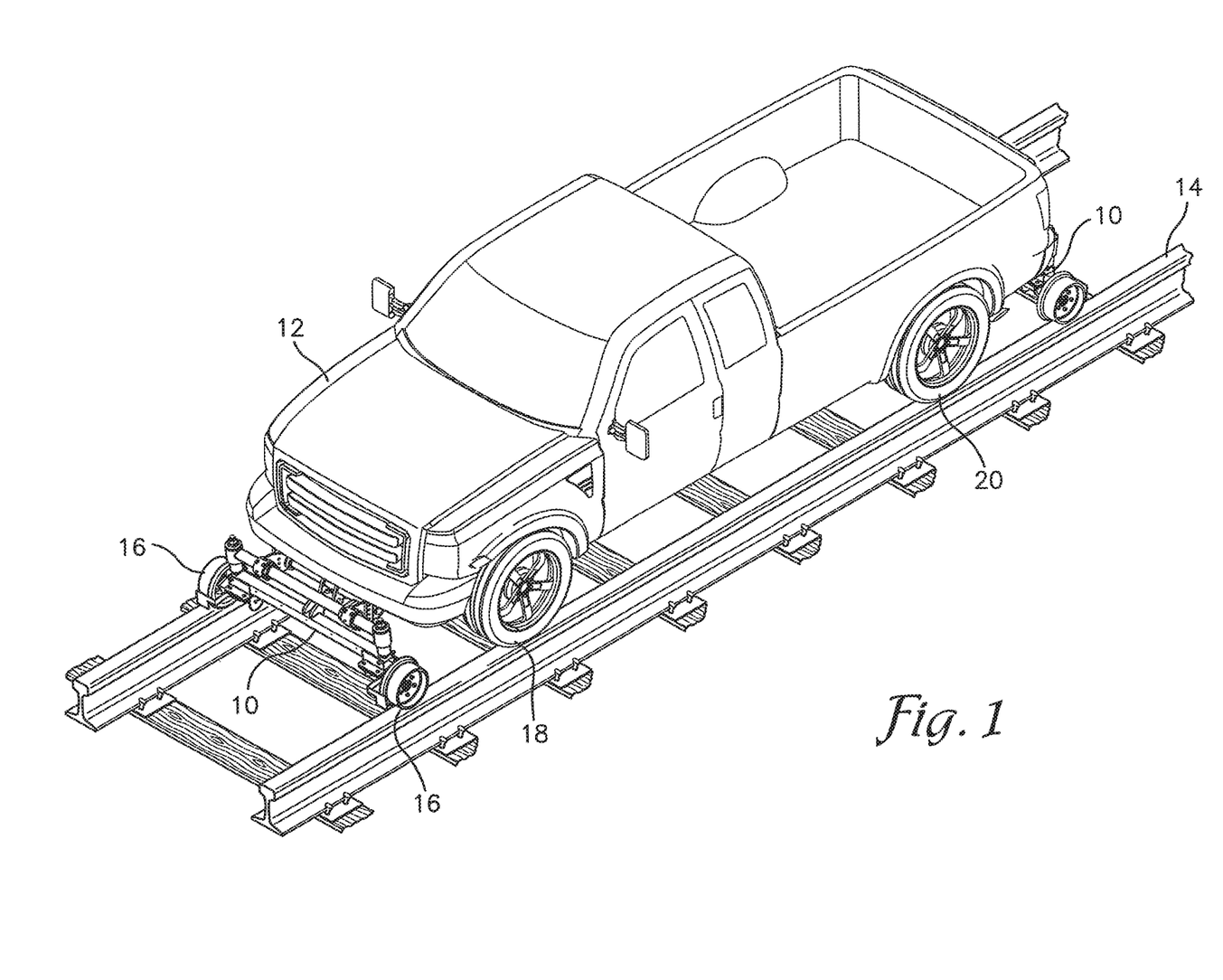
FIG. 1 is a perspective view of an embodiment of rail gear mounted to the front and rear of a truck and positioned upon rail tracks.

The dual capabilities of a truck mounted with rail gear provides great utility to the railroad industry. The truck with the rail gear in the off-rail position is able to quickly transit, in many situations at highway speeds, to the location where work needs to be performed. Once the truck arrives at the rail location, such as a standard crossing, the truck maneuvers to align itself parallel with the rails 14. As shown in FIG. 1, the forward and rear guide wheels 16 are located directly over the rails 16.

Prior to the primary actuator 230 commencing retraction in order to lower the guide wheels 16, the operator activates the locking rod member 262 which then extends outwardly from the locking actuator 250 and from the lower circular opening 244 at the end of the arcuate slot 242. When the locking rod member 262 is fully extended and is no longer seated in the circular openings 244 the rail gear 10 is unlocked. Confirmation of the location of the locking rod member 262 is provided by the proximity switches 276, 278. Once the locking rod member is fully extended the primary actuator 230 is able to rotate the axle tube 22 and the locking plate 240 relative to the stationary connector plate 190. It is only when the rail gear 10 reaches either the fully deployed on-rail position or the fully retracted off-rail position that the locking rod member 262 is also retracted and is able to seat within one of the circular openings 244, 246 located at each end of the arcuate slot 242 thereby locking the rail gear into either the on-rail position or the fully retracted, off-rail position.

The operator located within the truck cab, activates the primary actuator 230 to retract the rod mount 234. The rod mount 234 being connected to one or more pivot plates 236 on the axle tube 22 causes the axle tube 22 to rotate downward with rotation occurring at the pivot tube bushings 162, 164. The primary actuator 230 is held in position by rotational base mounts 232 on each side of the actuator that are secured to one or more pivot bar actuator plates 176 located on the pivot bar 170. The pivot bar 170 is held in position by the connector plates 190 secured to taper-lock bushings 178, 180 proximate each end 172, 174 of the pivot bar. The connector plates are in-turn fastened to frame rail mounting brackets 206 that are bolted to the frame rails of the truck. The sequence of the attachment leading to the frame rails of the truck demonstrates the rigid nature of the rail gear 10.

When in the on-rail position, the truck 12 must apply roughly 500 pounds of weight to each guide wheel 16 to safely maintain the guide wheel 16 on the rails 14 during transit. The amount of force applied to each guide wheel 16, when in the on-rail position, can be adjusted to achieve the desired force level. To increase the load applied to the guide wheels 16 the fastener 66 atop the upper end 56 of the spring shaft 46 is tightened to further compress the spring 44. In order to reduce the load on the guide wheels 16, the fastener 66 is loosened allowing the spring 44 to expand. During installation of the rail gear 10 to the truck frame rails, the installer calibrates the spring assemblies 34, 36 on each side of the rail gear by adjusting the fastener 66 atop each of the spring shafts 46 and confirms the load applied to the guide wheel using a scale.

Installation of the Rail Gear

Heavy duty trucks are extensively utilized by the railroad industry to inspect and maintain rails all across the world. Each of the major truck manufacturers, such as Ford, Chrysler and General Motors design and build their trucks to different specifications. An example with significance to the installation of rail gear is the span between the truck's frame rails. General Motors, Ford and Chrysler, for example, all utilize different frame rail spans and the span varies depending upon the model of the truck and possibly between model years of the same truck. This creates significant challenges for the installation of rail gear with fixed spans between the frame rail attachment plates that are used for attachment to the frame rails of the truck. During installation of the fixed span frame rails, the installer must, to the best of her ability, center the rail gear and yet align the frame rail attachment plates with the frame rails. To accomplish this, the installer must regularly utilize one or more shims per side between the frame rail attachment plates and the frame rails of the truck. This often creates a rail gear off-center condition that can adversely influence handling of the truck.

During installation of the rail gear 10 disclosed herein, the installer can readily adjust the span between the frame rail mounting brackets 190 to accommodate the span of the truck's frame rails without the need to use shims or spacers thereby substantially reducing installation time. To adjust the span, the installer loosens the set screws 163 on the pivot tube bushings 162, 164 as well as the set screws (not shown) on the taper lock bushings 178, 180. Once these set screws are loosened the installer modifies the span of the rail gear 10 by adjusting the location of the two pivot bar bushings 178, 180, the two pivot tube bushings 162, 164, the two connector plates 190 and the associated frame rail mounting brackets 206. The installer can easily position the two frame rail mounting brackets 206 against the frame rails and pass the mounting hardware through the brackets 206 and the truck's frame rails with minimal time and effort and without the need for shims or spacers. Once the frame rail mounting brackets 206 are secured in position, the installer then tightens the set screws 300 of the pivot tube bushings 162, 164 and the set screws 304 of the pivot bar bushings 178, 180 locking the desired span in place.

The installer must also route the ground wires from the hub assembly into the cab of the truck to a grounding switch. As previously noted, the grounding switch provides the truck with a mechanism for alerting the railroad control system that a vehicle is on the tracks at a specific location. With electrical connectivity between the rails established the railroad traffic detection system is able to track the truck and also to activate the automated railroad crossing gate or lights as to the approach of a vehicle. Alternatively, eliminating electrical connectivity, by toggling the switch in the cab of the vehicle, allows the truck to approach without activating the railroad crossing gate or lights.

Having shown and described various embodiments of the present invention, further adaptations of the apparatus described herein may be accomplished by appropriate modifications by one of ordinary skill in the art without departing from the scope of the present invention. Potential modifications will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

I claim:

1. A rail gear apparatus for attachment to the frame rails of a truck the rail gear operable between an on-rail and an off-rail position, the apparatus comprising:
   an axle tube with first and second oppositely disposed ends;
   a pivot tube with first and second oppositely disposed ends and first and second pivot tube bushings positioned between the first and second ends of the pivot tube;
   first and second spring assemblies, each spring assembly further comprising an upper end and a lower end, the lower ends of the first and second spring assemblies operably mounted proximate to the first and second ends of the axle tube, the first and second ends of the pivot tube mounted proximate the upper ends of the first and second spring assemblies;
   a pivot bar with first and second oppositely disposed ends and an actuator plate mounted to the pivot bar between the first and second ends, the pivot bar further comprising first and second pivot bar bushings mounted proximate the first and second ends each with an inner and outer face;
   a first and second connector plate each with a first end and a second end, the first ends of the connector plates secured respectively to the first and second pivot bar bushings and the second ends connected respectively to the first and second pivot tube bushings;
   a first and second frame rail mounting bracket secured to the first and second connector plates, the frame rail mounting brackets secured respectively to the two frame rails of the truck; and
   a primary actuator first end mounted to the pivot bar actuator plate and a primary actuator second end mounted to the axle tube, wherein actuation of the primary actuator second end away from the first end elevates the axle tube to the off-rail position, and furthermore alignment of the span of the frame rail mounting brackets to coincide with the span between the truck frame rails is accomplished by translation of the bushings along the pivot tube and pivot bar until the desired span between the frame rail mounting brackets is achieved.

2. The rail gear of claim 1, wherein the spring assemblies are further comprised of a spring surrounding a spring shaft with an upper spring tube and a lower spring tube surrounding the spring and spring shaft.

3. The rail gear of claim 2, wherein the upper and lower spring tubes each have a tube wall.

4. The rail gear of claim 3, wherein the lower spring tube is sized for insertion into the upper spring tube.

5. The rail gear of claim 4, wherein the spring shaft comprises an upper end and a lower end.

6. The rail gear of claim 5, wherein an upper end of the upper spring tube is capped with a plate, the upper spring tube plate comprising an opening for passage there through of the upper end of the spring shaft.

7. The rail gear of claim 6, wherein the lower end of the lower spring tube is capped with a plate, the lower spring tube plate comprising an opening for passage there through of the lower end of the spring shaft.

8. The rail gear of claim 7, wherein the spring is a compression spring.

9. The rail gear of claim 8, wherein the compression spring is a coil spring with an upper end and a lower end.

10. The rail gear of claim 9, wherein the upper end of the spring shaft is threaded for receipt of a spring compression adjustment nut.

11. The rail gear of claim 10, wherein a spring cushion is positioned between the lower spring tube cap and the lower end of the spring.

12. The rail gear of claim 11, wherein the spring cushion is an elastomeric bushing.

13. The rail gear of claim 12, wherein a support tube is secured to the lower end of the spring shaft.

14. The rail gear of claim 13, wherein secured to each of the first and second ends of the axle tube are a pair of support tube mounting plates, the mounting plates being disposed on laterally opposed sides of the axle tube.

15. The rail gear of claim 14, wherein a bolt passes through the support tube and the two oppositely disposed support tube mounting plates and the bolt is secured in position by a nut.

16. The rail gear of claim 15, wherein secured beneath each pair of support tube mounting plates is a shaft mounting plate.

17. The rail gear of claim 16, wherein mounted beneath each shaft mounting plate is a wheel unit assembly.

18. The rail gear of claim 17, wherein the wheel unit assembly comprises a guide wheel mounted to a hub assembly, the hub assembly in turn mounted to a spindle assembly.

19. The rail gear of claim 18, wherein the spindle assembly is comprised of a hub spindle surrounded by an insulator sleeve, the insulator sleeve and hub spindle are disposed within a spindle tube with an open end and a closed end.

20. The rail gear of claim 19, wherein the spindle tube is mounted to the shaft mounting plate.

21. The rail gear of claim 20, wherein the hub assembly rotates about the stationary hub spindle upon a set of sealed bearings.

22. The rail gear of claim 21, wherein the guide wheel is mounted to an outward facing face of the hub assembly.

23. The rail gear of claim 22, wherein the hub spindle is retained in position proximate the closed end of the spindle tube by at least one attachment means.

24. The rail gear of claim 23, wherein an electrical insulating material separates the hub spindle from the closed end of the spindle tube.

25. The rail gear of claim 24, wherein a ground wire traverses from a connection point on the hub assembly through an interior channel of the axle tube exiting the interior channel and into the cab of the truck.

26. The rail gear of claim 25, wherein separate ground wires traverse from each hub assembly into the cab of the truck.

27. The rail gear of claim 26, wherein a switch connects the ground wires traveling from between the two guide wheels.

28. The rail gear of claim 27, wherein an operator may close or open the circuit between the two guide wheels by operation of the switch.

29. The rail gear of claim 28, wherein the pivot tube bushings are two-piece shaft collars.

30. The rail gear of claim 29, wherein the pivot bar bushings are taper-lock bushings.

31. The rail gear of claim 30, wherein the primary actuator is a hydraulic actuator.

32. The rail gear of claim 31, wherein a locking plate is secured to and rotates with the pivot tube from the rail gear on-rail to off-rail positions, the locking plate further comprising an arcuate slot therethrough with circular openings at each end of the arcuate slot.

33. The rail gear of claim 32, wherein a locking actuator with an extensible end is mounted transversely within an opening in the connector plate proximate the locking plate, the locking actuator further comprising an actuator locking rod with a distal end, and a locking rod member mounted at the distal end of the locking rod.

34. The rail gear of claim 33, wherein in operation, the operator actuates the locking rod extending the locking rod member away from the locking plate thereby allowing the locking plate to rotate relative to the connector plate.

35. The rail gear of claim 34, wherein when the rail gear is fully deployed to either the on-rail position or to the off-rail position, the operator de-actuates the locking actuator causing the locking rod to retract and the locking rod member to seat within either of the circular openings at the ends of the arcuate slot.

36. A rail gear adjustable for attachment to varying widths of truck frame rails, the rail gear operable between an on-rail position and off-rail position, the rail gear comprising:
- an axle tube with first and second oppositely disposed ends and at least one axle attachment assembly mounted between the first and second ends of the axle tube;
- a pivot tube with first and second oppositely disposed ends and first and second pivot tube bushings slidably mounted onto the pivot tube;
- first and second spring assemblies each with an upper end and a lower end, the first and second ends of the pivot tube secured proximate to the upper ends of the spring assemblies, the lower ends of the first and second spring assemblies operably mounted proximate the first and second ends of the axle tube;
- a pivot bar with first and second ends, the first and second ends mounted within first and second pivot bar bushings, each bushing having an inner face and an outer face, the pivot bar further comprising at least one actuator attachment plate located between the first and second ends;
- a first and second connector plate each with a rear segment, a center segment and a forward segment, the rear segment of the connector plates mounted respectively to the first and second pivot bar bushings, the forward segments mounted respectively to the first and second pivot tube bushings;
- a first and second frame rail mounting bracket each with an upper portion and a lower portion, the lower portion of the first and second frame rail mounting brackets secured respectively to the center segment of the first and second connector plates, the upper portion of the first and second frame rail mounting brackets configured for attachment to the frame rails of a truck;
- a primary actuator with first and second ends, the primary actuator first end mounted to the at least one actuator attachment plate, the primary actuator second end mounted to the at least one pivot plate, wherein extension of the second end of the primary actuator rotates the axle tube to the off-rail position, the frame rail mounting brackets adjustable laterally to accommodate varying widths of truck frame rails.

* * * * *